(No Model.)
D. C. WOOD.
CULINARY VESSEL.
No. 525,933. Patented Sept. 11, 1894.
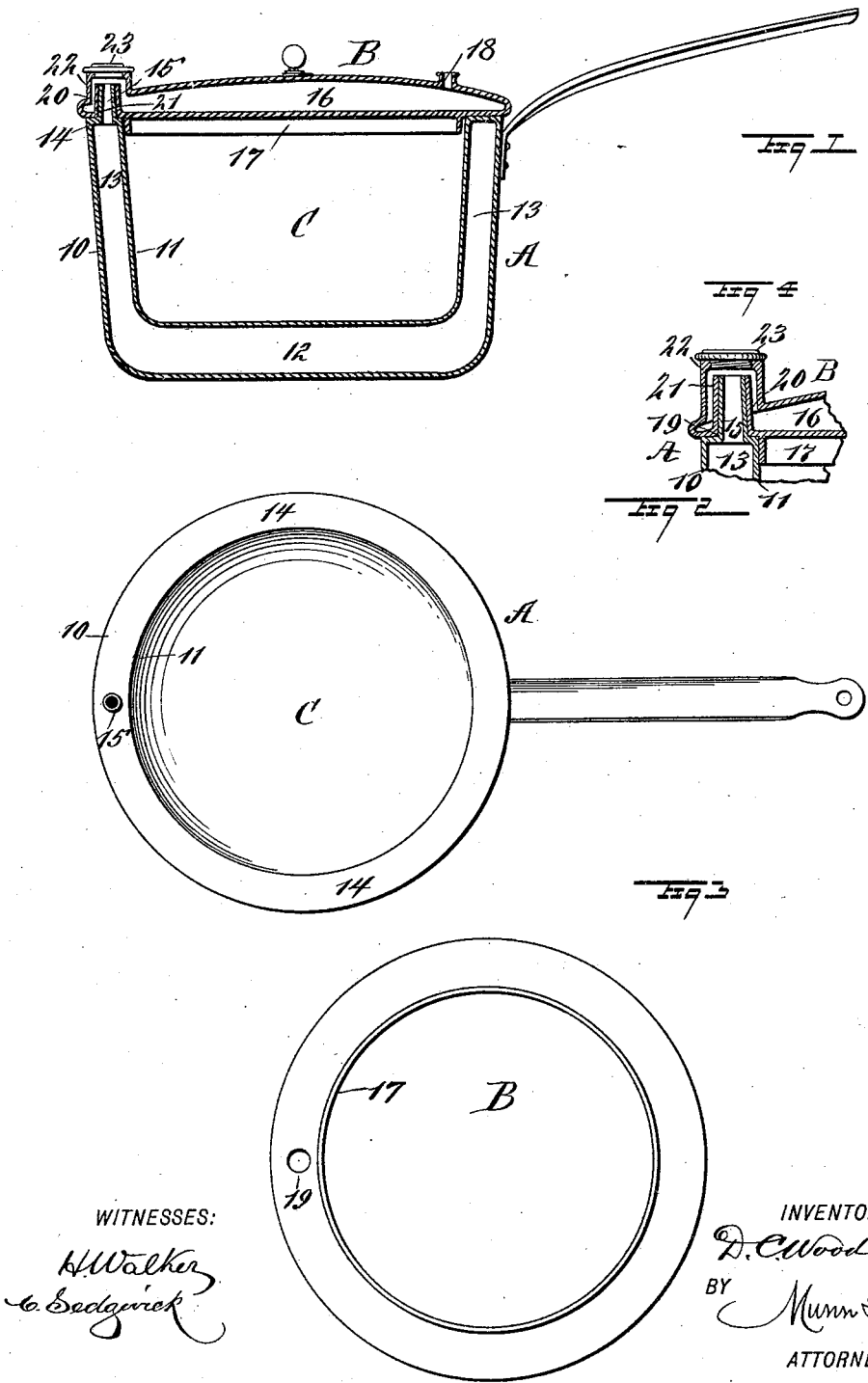
WITNESSES:
H. Walker
C. Sedgwick
INVENTOR
D. C. Wood
BY
Munn & Co
ATTORNEYS.

UNITED STATES PATENT OFFICE.

DAVID C. WOOD, OF MATAMORAS, PENNSYLVANIA.

CULINARY VESSEL.

SPECIFICATION forming part of Letters Patent No. 525,933, dated September 11, 1894.

Application filed December 22, 1892. Renewed July 24, 1894. Serial No. 518,439. (No model.)

*To all whom it may concern:*

Be it known that I, DAVID C. WOOD, of Matamoras, in the county of Pike and State of Pennsylvania, have invented a new and useful Improvement in Culinary Vessels, of which the following is a full, clear, and exact description.

My invention relates to an improvement in culinary vessels, and has for its object to provide a vessel in which water will be made to interpose the cooking compartment of the vessel and the fire, and also to construct the vessel in such manner that a space will surround the sides of the cooking compartment, which space will be in direct communication with the water space.

Another object of the invention is to provide a cover for the vessel, which cover will contain a chamber which will be as large as the construction of the cover will admit of, and to provide the cover with a connection between the upper space in the vessel and also with a steam exit opening, whereby when the cover is upon the vessel and water is contained within the water space, if heat is applied to the outer shell of the vessel steam will be generated, which will find its way from the water space through the upper space in the vessel into the cover and out therefrom, causing heat to be applied to the top of the vessel as well as to the bottom and sides thereof, insuring speedy and safe cooking of the contents of the cooking compartment of the vessel.

The invention consists in the novel construction and combination of the several parts, as will be hereinafter fully set forth and pointed out in the claim.

Reference is to be had to the accompanying drawings forming a part of this specification, in which similar figures and letters of reference indicate corresponding parts in all the views.

Figure 1 is a vertical section through a culinary vessel, with the cover in position thereon. Fig. 2 is a plan view of the body of the vessel. Fig. 3 is a bottom plan view of its cover; and Fig. 4 is a detail sectional view of the connection between the cover and body.

The body A of the vessel consists of an outer shell 10 and an inner shell 11. The outer shell is much larger than the inner shell, but both shells are practically of the same contour. The inner shell is suspended in the outer shell in such manner as to create a space 12 at the bottom between the two shells, and likewise a space 13 between the sides of the shells. The lower space 12, is adapted to be filled with water, and the upper surrounding space is for the reception of steam. The suspension of the inner shell within the outer one is accomplished by connecting the upper edges of the shells by means of a plate 14. The plate completely covers or incloses the upper portion of the upper space, and the said plate may if in practice it is found desirable, be a separate piece soldered or otherwise attached to the shells; or one of the shells may be made of sufficient height to enable its upper edge to be bent inward and horizontally to meet the opposite shell. In one portion of the plate 14, closing the spaces 12 and 13, an opening is made, and in this opening a tube 15, is fitted, which extends above the upper edge of the body a predetermined or desired distance.

The cover B of the vessel is constructed with an interior chamber 16, and this chamber is as large as the shape and construction of the cover will admit. The cover is preferably made of such size that it extends a slight distance beyond the outer edge of the outer shell or outer side of the body of the body of the vessel, as shown in Fig. 1; and the cover is likewise provided with a downwardly extending flange 17, adapted for engagement with the inner face of the inner shell of the vessel, or the inner wall of the cooking compartment C, as the space contained within the inner shell is adapted to receive the article or articles to be cooked.

At one side of the cover in the top, an outlet aperature 18, is made, and preferably in this orifice a tube is fitted, which extends above the upper face of the cover. Another orifice 19, is made in the bottom of the cover near its margin, and a second and larger orifice 20, is made in the upper face of the cover over the orifice 19, as is best shown in Fig. 4. In the lower orifice 19 of the cover a tube 21, is secured, and this tube extends upward through the upper orifice 20 beyond the top surface of the cover, while a second tube 22, is secured to the wall of the upper orifice 20, and this second tube extends upward from the cover around the inner tube 21 and above that tube, the outlet tube 22, being preferably provided with a screw cap 23. As the outer tube 22 is of greater diameter than the inner tube 21 of the cover a space intervenes the two, and that space is in direct communication with the chamber 16 of the cover; therefore, when the cover is placed upon the body the body tube 15, is made to enter the inner cover tube 21 and fit snugly therein, and when the cover is perfectly seated the upper ends of these two tubes are flush. Thus a communication is established between the body and the cover chambers, and there is no danger of steam or water from either of the compartments finding its way into the chamber or compartment C in which the food to be cooked is placed.

In the operation of the device the material to be cooked is placed in the compartment C of the vessel, and the cover being removed water is poured in through the tube 15, until the water space 12 at the bottom is filled, or practically so. The cover is then placed over the body of the vessel, the tube 15 of the body entering the inner tube 21 of the cover, and the screw cap is screwed to place. It will be observed that the water may be poured into the body of the vessel while the cover is yet in position by simply removing the cap 23. When the vessel is placed upon the stove and the water in the space 12 commences to boil, the steam will rise and pass into the space 13, therefore completely jacketing the inner compartment C, and the steam will pass out from the body through the tube 15 into the chamber of the cover, providing in this manner a steam jacket above the cooking compartment as well as around and beneath it. The surplus steam passes up through the outlet orifice 18. It will be noticed also that by removing the cap 23 the steam will escape at that point without heating the cover which may be found desirable in certain cases.

It is evident that in a culinary vessel constructed as above set forth, food of any character may be cooked without danger of burning said food, and furthermore that the food will cook much quicker than in ordinary steam cookers since the compartment in which the food is contained is entirely surrounded by a steam jacket.

Having thus described my invention, I claim as new and desire to secure by Letters Patent—

The combination with the inner and outer spaced vessels C A the upper portion of the space being closed and provided with an upwardly extending short tube 15, of the hollow cover resting on the upper edge of the jacketed vessel and having near one edge an open ended internal tube 21 extended upward from its bottom and receiving the tube 15, a short tube 22 extending from the top of the hollow cover concentric with the tubes 15, 21, and provided with a removable cap to permit (when in place) the steam from the water space to pass through the cover and when removed permitting the escape of steam or the introduction of water as may be desired, and a steam outlet 18 in the top cover, substantially as set forth.

DAVID C. WOOD.

Witnesses:
GEORGE GEYER,
CHARLES G. MEINERMAN.